(12) United States Patent
Kuechler

(10) Patent No.: US 10,559,149 B1
(45) Date of Patent: Feb. 11, 2020

(54) DYNAMIC ANCHOR PRE-SELECTION FOR RANGING APPLICATIONS

(71) Applicant: NXP B.V., Eindhoven (NL)

(72) Inventor: Wolfgang Kuechler, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/154,131

(22) Filed: Oct. 8, 2018

(51) Int. Cl.
*G07C 9/00* (2006.01)
*G01S 11/08* (2006.01)

(52) U.S. Cl.
CPC .......... *G07C 9/00309* (2013.01); *G01S 11/08* (2013.01); *G07C 9/00658* (2013.01); *G07C 2009/00325* (2013.01)

(58) Field of Classification Search
None
See application file for complete search history.

(56) References Cited

U.S. PATENT DOCUMENTS

| | | | |
|---|---|---|---|
| 5,550,816 A * | 8/1996 | Hardwick | H04L 12/4604 370/397 |
| 6,034,617 A | 3/2000 | Luebke et al. | |
| 6,747,545 B2 | 6/2004 | Nowottnick et al. | |
| 8,319,605 B2 | 11/2012 | Hassan et al. | |
| 9,810,767 B1 * | 11/2017 | Hamilton | G01S 5/14 |
| 9,858,451 B2 | 1/2018 | Ianni et al. | |
| 2004/0100898 A1 * | 5/2004 | Anim-Appiah | H04L 1/206 370/210 |
| 2007/0075873 A1 | 4/2007 | Yang et al. | |
| 2008/0032654 A1 * | 2/2008 | Qiu | H04B 7/0811 455/277.2 |
| 2010/0135178 A1 * | 6/2010 | Aggarwal | G01S 5/0205 370/252 |
| 2016/0150469 A1 * | 5/2016 | Hsu | H04W 52/0206 370/311 |
| 2016/0234684 A1 * | 8/2016 | Hekstra | H04K 1/02 |
| 2017/0200335 A1 | 7/2017 | Da Deppo et al. | |
| 2017/0359134 A1 | 12/2017 | Baier et al. | |
| 2018/0138993 A1 | 5/2018 | Kuechler et al. | |
| 2018/0254923 A1 * | 9/2018 | Dutz | H04L 25/0202 |
| 2018/0275267 A1 | 9/2018 | Reisinger et al. | |
| 2018/0275268 A1 * | 9/2018 | Reisinger | H04L 7/0008 |
| 2018/0288730 A1 | 10/2018 | Kuechler et al. | |
| 2018/0356492 A1 * | 12/2018 | Hamilton | G01S 13/76 |

(Continued)

FOREIGN PATENT DOCUMENTS

EP  3287331  2/2018

OTHER PUBLICATIONS

U.S. Appl. No. 16/029,462.
(Continued)

*Primary Examiner* — Carlos Garcia

(57) ABSTRACT

In a wireless communication system, ranging is performed between an initiator and one of a plurality of responders. Before the ranging operation is performed, the initiator preselects the responder, wherein the preselection is based on a comparison of a measured metric associated with signals carrying packets received from the responders by the initiator. The initiator utilizes only a portion of the preamble in each of the packets to measure the metric. The signals are transmitted in the wireless communication system utilizing ultra-wideband frequencies.

20 Claims, 10 Drawing Sheets

(56) References Cited

U.S. PATENT DOCUMENTS

2019/0074930 A1* 3/2019 Kuchler ............... H04B 1/7183

OTHER PUBLICATIONS

U.S. Appl. No. 16/013,783.
U.S. Appl. No. 15/611,014.
T. Glocker et al., "A Protocol for a Secure Remote Keyless Entry System Applicable in Vehicles using Symmetric-Key Cryptography," 2017 8th International Conference on Information and Communication Systems (ICICS), Apr. 4-6, 2017, 6 pages.
IEEE Standard for Low-Rate Wireless Personal Area Networks (WPANs), IEEE Std 802.15.4-2015 (Revision of IEEE Std 802.15.4-2011), IEEE Computer Society, Dec. 2015, 709 pages.
K. Finkenzeller, "RFID Handbook—Fundamentals and Applications in contactless Smart Cards, Radio Frequency Identification and Near-Field Communication, Third Edition," John Wiley & Sons, Ltd., 2010, 480 pages.
"Smart Key," Wikipedia, downloaded from Internet on May 11, 2018, 6 pages.

\* cited by examiner

US 10,559,149 B1

DYNAMIC ANCHOR PRE-SELECTION FOR RANGING APPLICATIONS

FIELD

The present disclosure relates in general to wireless networks used for electronic access and authorization, and in particular, to the utilization of a ranging operation between wireless devices.

BACKGROUND

Wireless electronic access and authorization is becoming more prevalent in many applications, including vehicles, homes, and office buildings. However, because such wireless methods are susceptible to fraudulent or unauthorized efforts, various techniques have been developed in response.

For example, passive keyless entry ("PKE") is an automotive security system that operates automatically when the driver is in proximity to the vehicle, unlocking the door on approach or when the door handle is pulled, and locking it when the driver walks away or touches the car on exit. PKE systems are also used to secure buildings or areas of buildings.

A PKE device (sometimes generally referred to as a smart key) allows the driver to keep the key fob pocketed (or in a handbag) when unlocking, locking, and starting the vehicle. The key fob may be identified via one of several antennas in the car's bodywork and a radio pulse generator in the key fob housing. Depending on the system, the vehicle may be automatically unlocked when a button or sensor on the door handle or trunk release is pressed. Some vehicles with a smart key system allow the driver to activate the ignition without inserting a key in the ignition, provided the driver has the key fob inside the car. On such vehicles, this is commonly done by pressing a starter button or twisting an ignition switch. When leaving a vehicle that is equipped with a smart key system, the vehicle may be locked by either pressing a button on a door handle, touching a capacitive area on a door handle, or simply walking away from the vehicle. Some vehicles automatically adjust user customized settings based on the particular smart key used to unlock the car. User preferences such as seat positions, steering wheel position, exterior mirror settings, climate control (e.g., temperature) settings, and stereo presets are popular adjustments. Some vehicle models even have settings to prevent the vehicle from exceeding a maximum speed if it has been started with a certain key fob.

Communications between a PKE device and the vehicle are performed using wireless radio frequency ("RF") systems, and more particularly wideband RF applications such as Ultra-Wideband ("UWB") technology, which are capable of accurate distance measurements between two or more wireless devices. Typically, these measurements are based on Time-of-Flight ("ToF") calculations that are derived by accurate determinations of departure and arrival times of RF packets between the two devices. The high bandwidth of UWB equates to short pulses, which means that high ranging precision in short measurement times can be achieved with this technology. RF packets travel at the speed of light, and thus a calculated ToF allows a determination of the distance between the devices. Such a procedure is commonly referred to as "ranging" (also referred to herein as a "ranging operation"). One practical application of ranging is "distance bounding" whereby ToF calculations are used to verify whether the distance between two devices is less than a predefined threshold. Ranging and distance bounding can be used for PKE systems and other access control systems, as well as for contactless electronic payment systems.

A drawback of the high bandwidth of UWB is that a receiving device should employ a very wide channel filter and process the data at a very high sampling rate. A consequence of these design constraints is a high current consumption of the receiving device. This is especially problematic for small battery powered devices. A coin cell battery may only be able to deliver <10 mA at low temperatures, especially an older coin cell battery. The receiving device, however, may require >100 mA peak current in order to satisfactorily receive and process the UWB signals. Therefore, an energy storage capacitor is typically required to bridge the gap between the current the receiving device requires and the current the battery can deliver. This is especially problematic for PKE systems in automotive applications since a larger energy storage capacitor requires a longer time to recharge after discharge, which slows down the ability of the receiving device to process successive incoming signals from the vehicle. It can be readily appreciated that a vehicle designer/engineer does not want an electronic system that experiences an unsatisfactory delay for a car door to unlock or an ignition to fire.

DETAILED DESCRIPTION

Embodiments of the present disclosure are described herein that utilize a ranging operation between wireless devices for electronic access and authorization applications. Though examples are described with respect to wireless communications in a PKE system utilized in a vehicle, embodiments of the present disclosure are applicable to any application that utilizes ranging between wireless devices for electronic access and authorization applications, including, but not limited to, home or building security systems and electronic payment systems.

Figure 1:
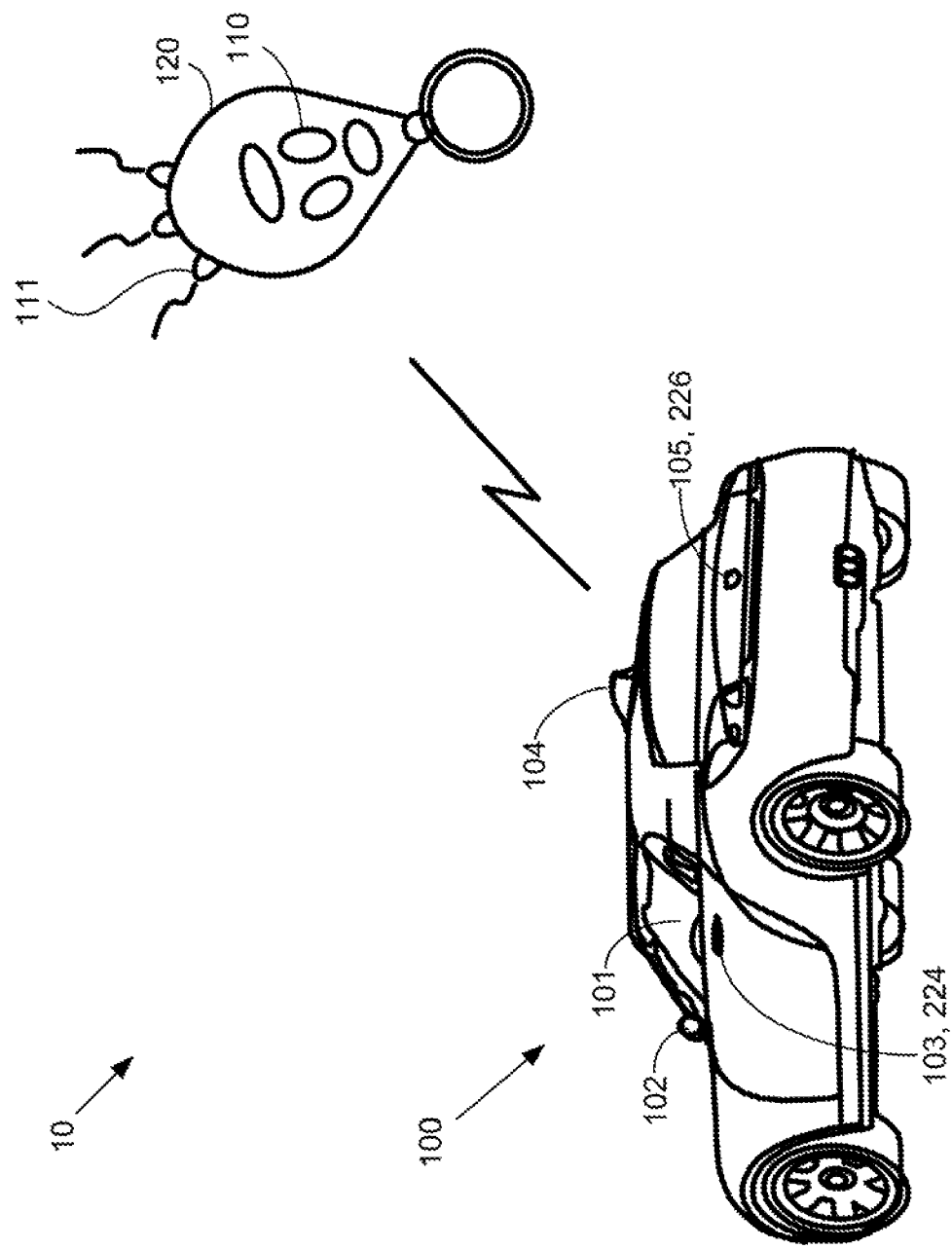
FIG. 1 illustrates a simplified diagram of a vehicle and associated key fob configured in accordance with embodiments of the present disclosure.

As used herein, the terms "tag" and "initiator" may be referred to interchangeably (with a key fob being a particular example of such a tag or initiator as described with respect to FIG. 1), and the terms "anchor" and "responder" may be referred to interchangeably.

Applications that utilize ranging typically require ranging to be performed between one initiator and multiple responders. The initiator in many practical applications is battery powered, and thus it is desirable to conserve energy consumption in the initiator. Because there is often the occurrence of numerous instances when the initiator will have to communicate with multiple responders, considerable energy can be consumed by the ranging occurring between the initiator and the responders over the lifetime of the initiator and its small battery. Additionally, as previously noted, the ranging between the initiator and multiple responders may require the time consuming process of charging an energy storage capacitor before the transmission of each ranging packet from the initiator, which can adversely affect the performance of the electronic access and authorization system (e.g., a PKE system for a vehicle).

For example, in an automotive application, the initiator may be integrated in a key fob powered by a coin cell battery, and the number of responders may be fairly numerous (e.g., typically 4-8). The timing budget for the ranging operation is typically 10 ms to 20 ms. The shorter the time the receiver circuitry in the initiator is enabled, the less current and hence the less energy is consumed. Embodiments of the present disclosure achieve this for scenarios where an initiator should perform ranging to multiple responders. This has the following benefits:

(1) The energy storage capacitor size can be reduced, as less energy needs to be stored, thus making the initiator device cheaper to manufacture, and the initiator device smaller;

(2) Battery lifetime of the initiator is extended, as less energy is consumed;

(3) The time required to perform a complete ranging operation between an initiator and a selected responder is decreased, as an implemented smaller energy storage capacitor can be more quickly recharged.

Typically, the initiator starts the ranging operation by transmitting an initial packet. All responders respond in a time-multiplexed or interleaved fashion. Embodiments of the present disclosure utilize a portion of the preamble section of the packets sent by the responders to measure certain signal quality metrics associated with the packets, which only require the receiver circuitry in the initiator to be enabled during such a portion of the preamble section of the packet. The signal quality metrics are used by the initiator to perform a preselection of a particular responder (e.g., the most suitable responder), or a subset of the total number of responders. Thereafter, a complete ranging operation is only performed with the selected responder(s).

Several different possible signal quality metrics may be utilized within embodiments of the present disclosure including, but not limited to, "preamble acquisition successful," "power of the main path power," and "received signal strength indicator (RSSI)," which are further described herein. Any of these signal quality metrics may be used to assess and rank the quality levels of the communication links between the initiator and each of the individual responders. Such a ranking can then be used to select a certain responder, or a subset of responders, for the subsequent complete ranging operation, as is further described herein.

As previously noted, PKE functionalities have become common in vehicles to provide access and start functions and to provide wide ranging functions to improve driver safety and convenience. These systems include Passive Entry and Passive Start ("PEPS") systems, which include a remote receiver and transmitter (or transceiver) and an electronic control module disposed within the vehicle. In such systems, a remote transceiver is carried with the user in a portable communication device such as a key fob or a card (i.e., the initiator). The portable communication device when successfully challenged transmits an RF signal to a PEPS module within the vehicle, which starts the authentication process to validate the user. The PEPS module in turn sends status information on a system vehicle bus to other vehicle control modules, which can perform a variety of tasks such as door lock/unlock, enabling engine start, or activating external/internal lighting and other driver preferences.

In addition to keyless and passive entry systems, "gesture recognition" has become popular for accessing vehicles. Such gesture recognition systems often utilize various sensors, such as capacitive sensors. Capacitive sensors include a sensor electrode or multiple electrodes that can detect an object in a "detection area" space in front of the sensor electrode(s). In one type of system, for example, a control and evaluation circuit is coupled to the sensor electrode and detects a change in the capacitance of the sensor electrode with respect to a reference potential. These sensors can be coupled to a non-metallic portion of the vehicle, such as the region of a lower sill area, a lower fender, or a bumper, and are typically used to operate (open/close) a door of a motor vehicle, a trunk, or a tailgate by detecting the approach of a body part. For example, a pivoting movement of a leg/foot under the bumper and forward under it can serve as a command to open or close the trunk or tailgate to a control device in the motor vehicle. The "gesture sensor" can, in some applications, be combined and monitored in conjunction with the proximity of a key fob or PEPS device to assure that the person providing the "gesture" also has the right to access the vehicle. Embodiments of the present disclosure can be utilized to provide such access and authorization.

As used herein, the term "gesture" refers to a movement of a part of a body of a human or user to express the user's intent. Gestures include, but are not limited to, movements involving hands, feet, and other body parts. As used herein, the term "gesture sensor" refers to a sensor that detects the gesture of a human or user. Such a gesture sensor may detect the gesture in a number of ways including, but not limited to, visually sensing the gesture, sensing the gesture using a proximity sensor, sensing the gesture by changes in a generated field (such as an electrical field), a capacitive sensor, and so forth. Various types of sensors may be potentially combined to provide more accurate sensing results.

As used herein and within the figures, "TX" refers to the transmitting of a wireless signal, and "RX" refers to the receiving or receipt of a wireless signal. Additionally, the terms "packet" and "frame" may be used interchangeably as referring to formatted, aggregated bits that are transmitted together in time across a physical medium (e.g., a wireless network).

Figure 2:
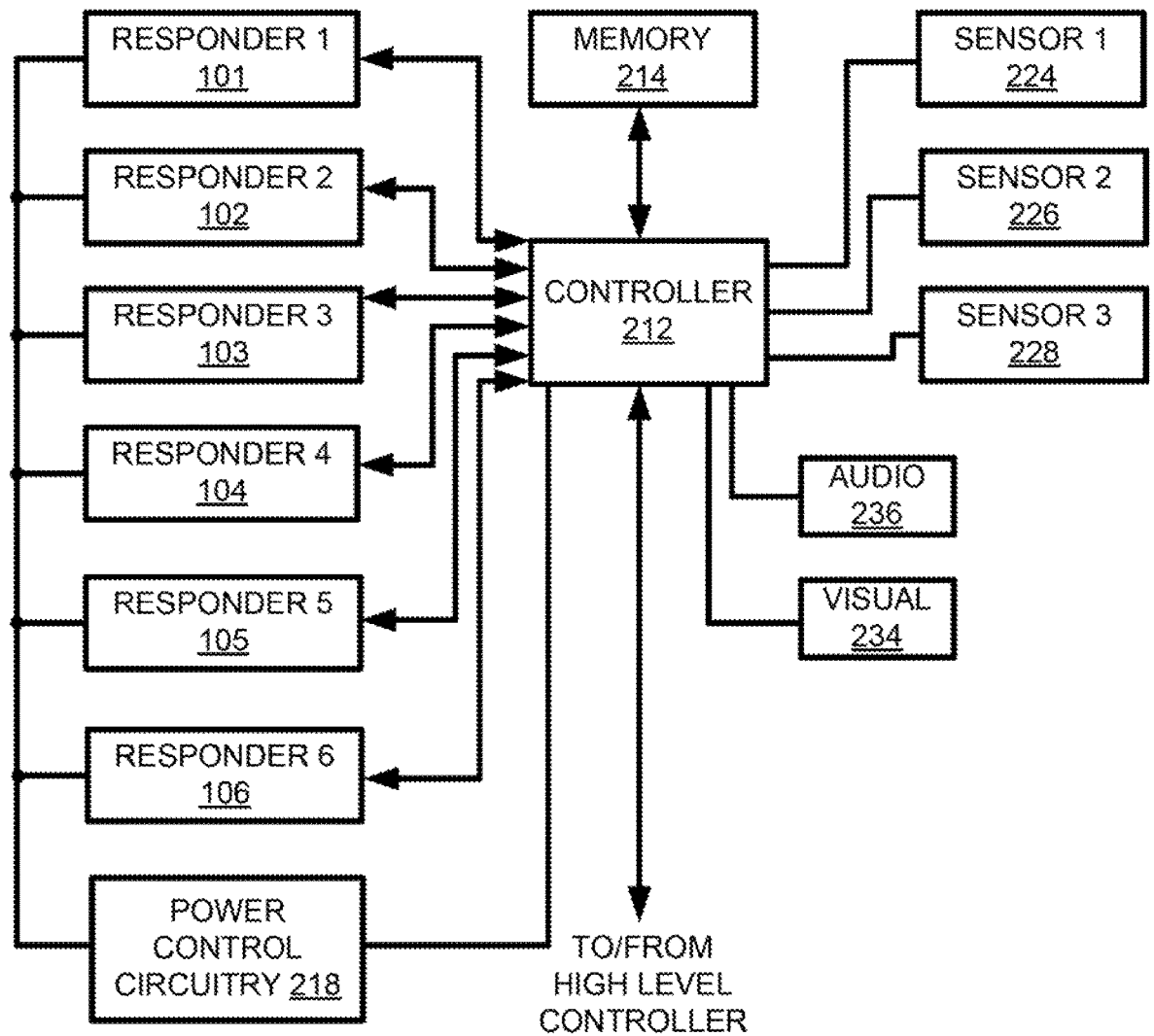
FIG. 2 illustrates a block diagram of various circuitry and electrical components of a vehicle configured in accordance with embodiments of the present disclosure.

Referring to FIGS. 1 and 2, a wireless communication system 10 is shown. The system 10 includes a vehicle 100 including the responders 101-106 (the responder 106 is hidden in FIG. 1) communicating with a tag, which may be implemented as a mobile electronic user device 120, which here is shown and described as a key fob. It will be apparent that the mobile electronic user device 120 can be many types of application-specific or personal computerized devices, including, for example, transponder cards, personal digital assistants, tablets, cellular phones, and smart phones. Communications are typically described herein as bi-directional between the responders and the key fob 120, although it will be apparent that in many applications one-way communications will be sufficient. In accordance with certain embodiments of the present disclosure, such communications are configured within a PKE system.

Optionally, one or more sensors (e.g., gesture sensors) 224-226 may be embedded in the vehicle 100 as illustrated in FIGS. 1 and 2. For example, a sensor 226 may be embedded in the trunk or tail lights, and a sensor 224 may be embedded within a door handle. Sensors may also be embedded in the glazing adjacent the window or behind cladding along a bottom edge of the vehicle 100, or in an applique that is attached to the vehicle 100. As such, each of these sensors 224-226 may be positioned to provide access points for a user to provide gesture control.

Though FIGS. 1 and 2 are illustrated and described as having six responders 101-106 and three optional sensors 224-226, embodiments of the present disclosure may be implemented with any number of such responders and sensors.

Furthermore, FIG. 1 is illustrated as having responders embedded in various exemplary locations within the vehicle 100, such as the responder 101 located somewhere within the inside of the vehicle cabin (e.g., near the driver seat), the responder 102 embedded within the mirror, the responder 103 embedded within the left-side door handle, the responder 104 embedded within the shark fin antenna, the responder 105 embedded within the trunk latch, and the responder 106 (hidden) embedded within the right-side door handle. However, such responders may be positioned in any other desired locations within the vehicle 100.

Figure 3:
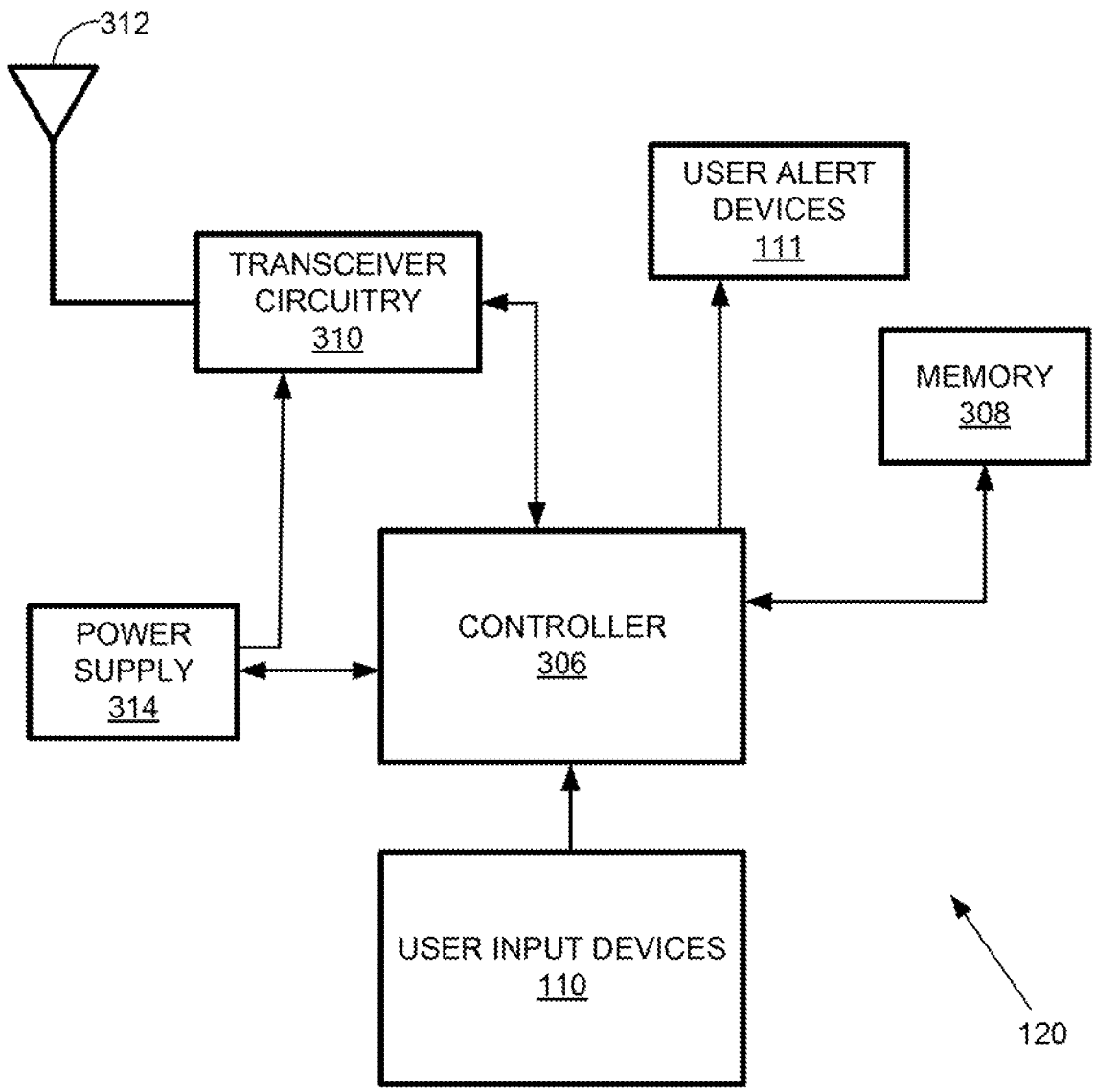
FIG. 3 illustrates a block diagram of various circuitry and electrical components of a key fob configured in accordance with embodiments of the present disclosure.

Referring to FIGS. 1 and 3, the key fob 120 may include one or more user input devices 110 and/or one or more user output or alert devices 111. The user input devices 110 may be switches such as buttons that are depressed by the user. The user output alert devices 111 may be one or more visual alerts, such as light emitting diodes ("LEDs"), a liquid crystal display ("LCD"), an audible alarm, or a tactile or vibratory device. A single function can be assigned to each input device 110 or user alert device 111, or a combination of input devices or a display menu could be used to request a plethora of functions via input device sequences or combinations. The system may be configured so that the key fob 120 can, for example, provide commands to start the vehicle, provide passive entry (that is, automatic unlocking of the doors of the vehicle 100 when the key fob 120 is within a predetermined proximate distance of the vehicle 100), activate external and internal vehicle lighting, preparation of the vehicle locking system, activation of a vehicle camera for vehicle action in response to camera-detected events, opening windows, activating internal electric devices, such as radios, telephones, and other devices, and adjustment of driver preferences (for example, the position of the driver's seat and the tilt of the steering wheel) in response to recognition of the key fob 120. These functions can be activated by the input devices 110 or automatically by the vehicle 100 detecting the key fob 120. Although a single key fob is shown here, it will be apparent that any number of key fobs could be in communication with the vehicle 100, and the vehicle's corresponding controller 212 could associate a different set of parameters with each key fob.

In addition, the controller 212 may be configured to wirelessly activate the output or alert devices 111, and/or audio 236 or visual 234 alert devices on the vehicle 100, to notify the vehicle user that the key fob 120 is within communication distance or some other predetermined distance of the vehicle 100, notify the vehicle user that a vehicle event has occurred (e.g., activation of the vehicle security system), confirm that an instruction has been received from the key fob 120, or that an action initiated by key fob 120 has been completed.

Figure 5:
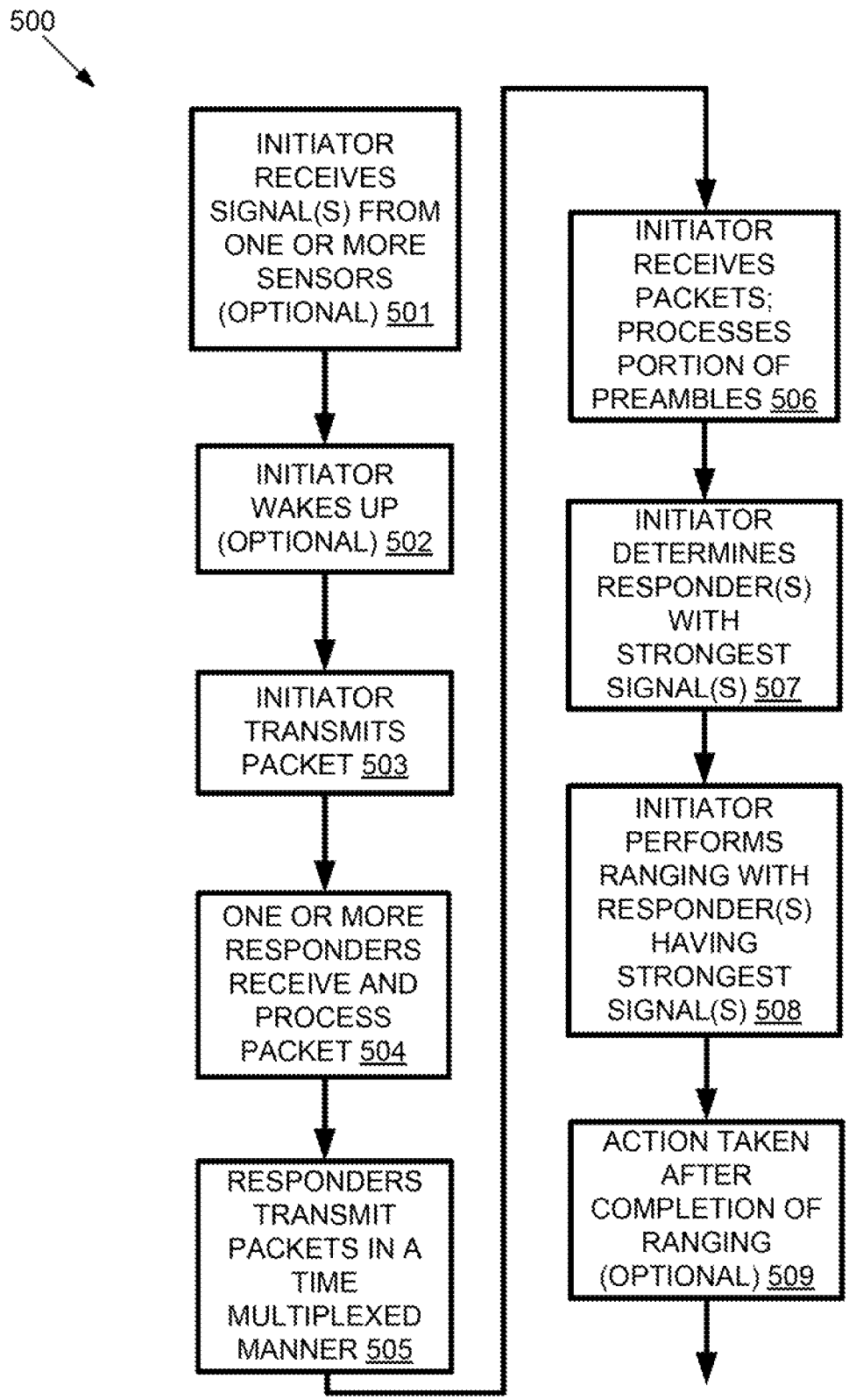
FIG. 5 illustrates a flow diagram of a process 500 by which an initiator and one or more responders communicate in accordance with embodiments of the present disclosure.
Figure 9:
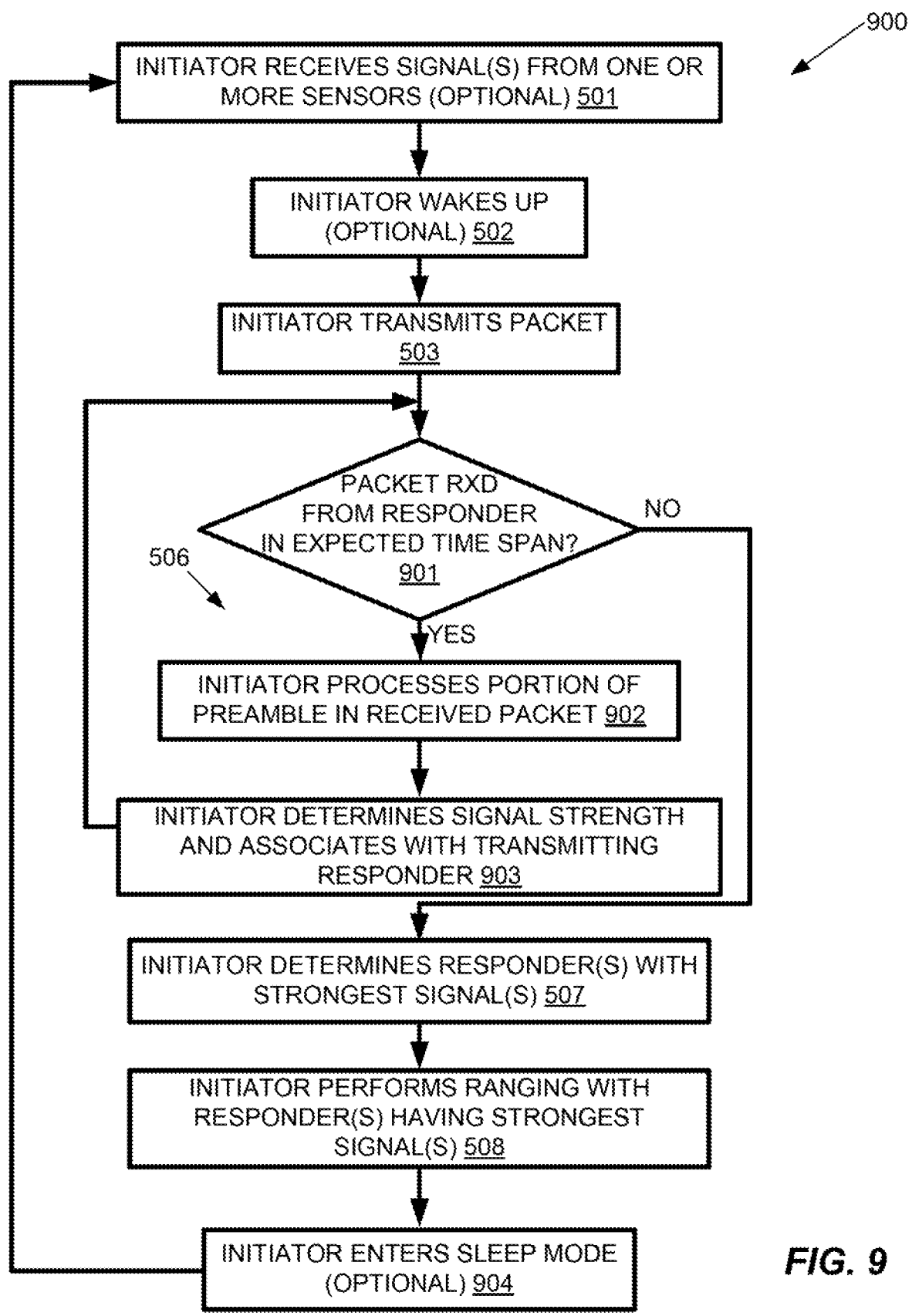
FIG. 9 illustrates a flow diagram of a process performed within a tag in accordance with embodiments of the present disclosure.
Figure 10:
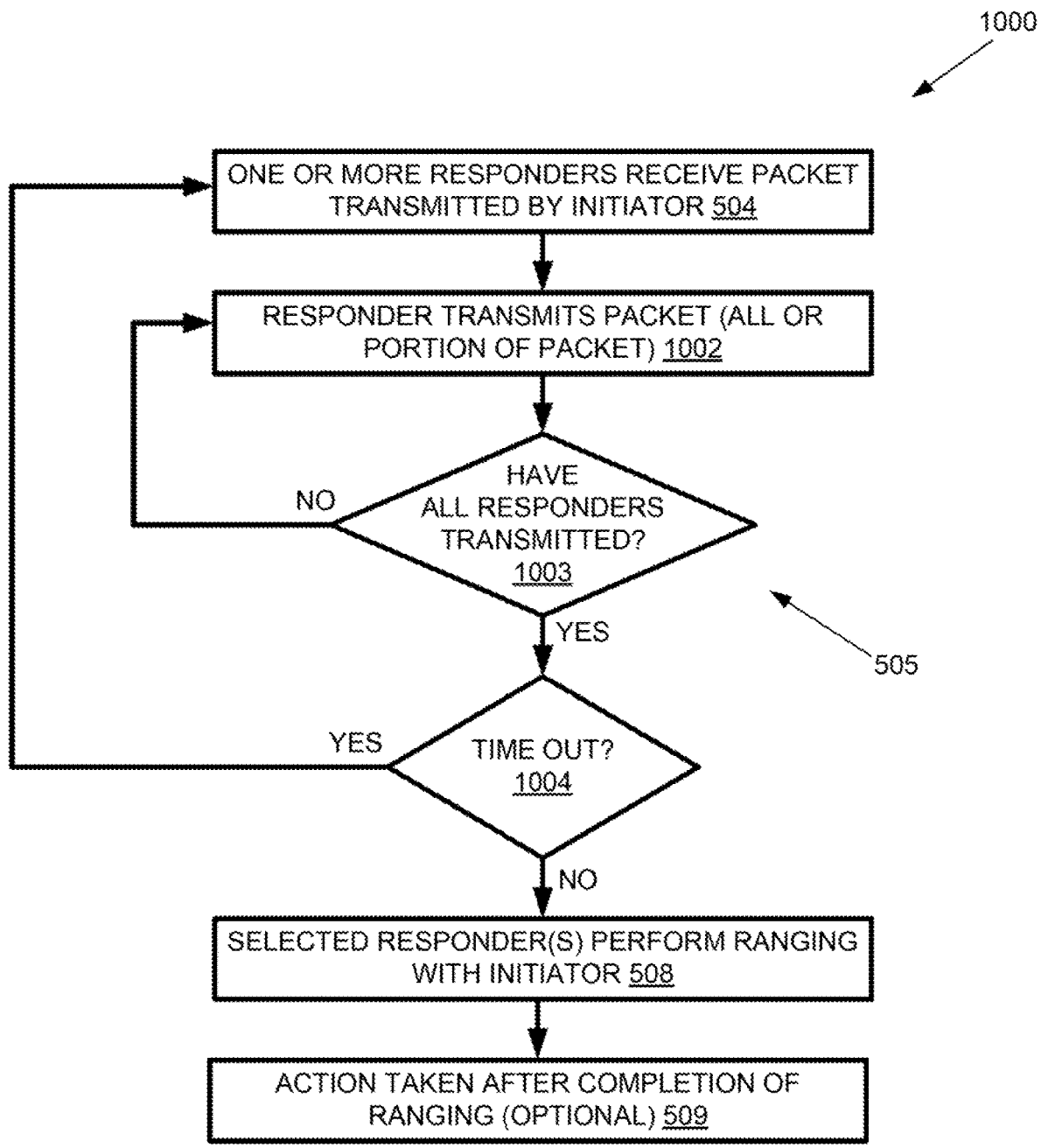
FIG. 10 illustrates a flow diagram of a process performed with respect to one or more anchors in accordance with embodiments of the present disclosure.

Referring to FIG. 2, the responders 101-106 and optional sensors 224-226 may be coupled to a controller 212, which may be configured to operate in accordance with embodiments of the present disclosure as described herein with respect to FIGS. 5 and 10. The controller 212 may be coupled to a memory 214. Power control circuitry 218 may be configured to provide power for the controller 212 and the responders 101-106. In accordance with alternative embodiments of the present disclosure, one or more of the responders 101-106 and/or the sensors 224-226 may be configured with low frequency ("LF") transmitters and coils for transmitting "wake up" signals (also referred to as a "beacon") to the key fob 120 when it is within a predetermined proximity (as further described herein with respect to FIGS. 5 and 9). Several such LF transmitters may cover specific zones inside and outside the vehicle 100. If the key fob 120 is within range (e.g., within one to two meters), the "sleeping" key fob 120 picks up the beacon, which wakes the key fob 120. The key fob 120 may then reply to the vehicle 100 using a separate RF channel (e.g., UWB), such as further described herein with respect to FIGS. 5 and 9. The message contained in the beacon may vary based on each transmitter zone. For example, the message could vary based on whether the zone was inside or outside the vehicle 100, or, even whether the zone is on the driver's side, passenger side, or in proximity to the trunk. This capability allows the initiator (e.g., the key fob 120) to send specific answers that will trigger specific actions such as opening the passenger door or starting the engine if the key fob 120 is inside the vehicle 100 (e.g., see the process block 509 as described with respect to FIGS. 5 and 10).

Referring now to FIG. 3, a block diagram of an exemplary initiator (e.g., the key fob 120) that can be used in accordance with the disclosed wireless communication system 10 may include a controller 306, memory 308, transceiver circuitry 310 and corresponding antenna 312, and a power supply 314 (e.g., a coin cell battery). Optional user input devices 110 and user alert devices 111 may be implemented and are in communication with the controller 306. The transceiver circuitry 310 may include transmitter circuitry and receiver circuitry (discussed herein with respect to FIG. 11), the receiver circuitry demodulating and decoding received RF signals to derive information, and to provide the information to the controller 306 to provide functions requested from the initiator 120. The transmitter circuitry encodes and modulates information from the controller 306 into RF signals for transmission via the antenna 312 to the responders 101-106.

The antenna 312 located within the initiator 120 may be configured to transmit long-range ultra-high frequency (e.g., UWB) signals to the responders 101-106 and receive short-range low frequency ("LF") signals from the vehicle 100. However, separate antennas may also be included within the initiator 120 to transmit such signals. In addition, various antennas in the vehicle may be configured to transmit LF signals to the initiator 120 and receive UWB signals from the initiator 120. Also, separate antennas may be included within the vehicle 100 to transmit LF signals to the initiator 120 and receive the UWB signals from the initiator 120.

In accordance with certain embodiments of the present disclosure, a motion detection device can optionally be included in the initiator 120 to detect movement of the initiator 120. The controller 306 can, for example, utilize the motion or lack of motion detected from the movement sensor to place the initiator 120 in a sleep mode when no motion is detected for a predetermined time period. The predetermined time period during which no motion is detected that could trigger the sleep mode could be a predetermined period of time or a software configurable value. Such a motion detection device could additionally or alternatively be provided in the vehicle 100.

According to various aspects of the present disclosure, when a user enters a localized field surrounding the vehicle 100, this user entrance into the localized field is detected by the system 10. In some embodiments, the system 10 may use Doppler to detect the presence of a user in the localized field. In other embodiments, one or more capacitive sensors, such as the specific sensors 224, 226, 228 surrounding the vehicle 100, may be used to detect the user in the localized field. In still other embodiments, wireless protocols such as E-field communication, H-field communication, LF, RF/LF including an LF/RFID security validation signal, HF, or microwave may be utilized. In still yet other embodiments, visual and/or optical user detection may be used. Further, various combinations of Doppler, capacitive, wireless, and visual/optical field detection may be utilized in combination with one another. As one illustrative example, the detection of the entrance of the user into the localized field may occur by one or more of the specific sensors 224, 226, 228, may occur by detection of the initiator 120 (using, for example, LF or RFID communication), or may occur by some combination thereof.

Figure 4:
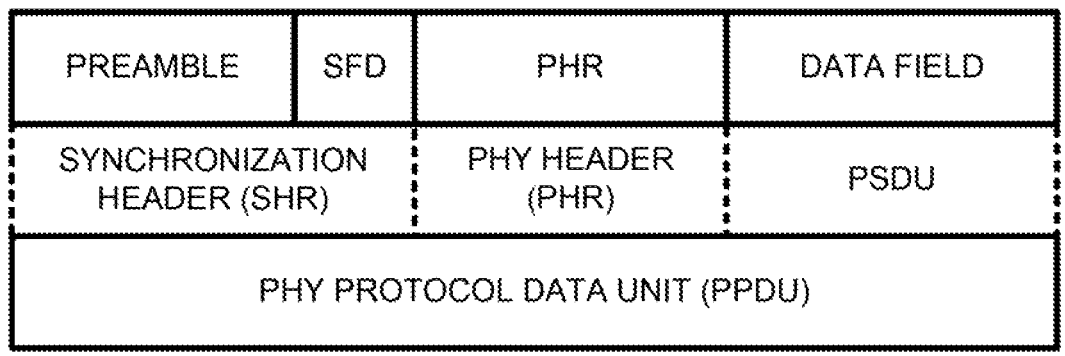
FIG. 4 illustrates a UWB PHY frame structure.

As previously disclosed, embodiments of the present disclosure utilize UWB technology to communicate information between the initiator (e.g., the key fob 120) and one or more responders (e.g., the responders 101-106) within the system 10. Specifications for such UWB technology are set forth in IEEE 802.15.4a, which is a standard that specifies a wireless physical layer ("PHY") to enable precision ranging. IEEE 802.15.4a is hereby incorporated by reference. In IEEE 802.15.4a networks, devices communicate using a high rate pulse repetition frequency ("HRP") packet format such as illustrated in FIG. 4. Each packet, or PHY protocol data unit ("PPDU"), may contain a synchronization header ("SHR") preamble, a PHY header ("PHR"), and a data field, or PHY service data unit ("PSDU"). The SHR preamble is composed of a (ranging) preamble and a start-of-frame delimiter ("SFD"). The SFD signals the end of the preamble and the beginning of the PHR. The numbers of symbols in the preamble are specified according to application requirements. There can be 16, 64, 1024, or 4096 symbols in the preamble, yielding different time durations for the SHR of the UWB frame. Each preamble code is a sequence of code symbols drawn from a ternary alphabet {−1,0,1}, which are selected for use in the UWB PHY because of their perfect periodic autocorrelation properties. The PHR conveys information necessary for successful decoding of the packet to the receiver: the data rate used to transmit the PSDU, the duration of the current frame's preamble, and the length of the frame payload (0-1209 symbols).

Figure 11:
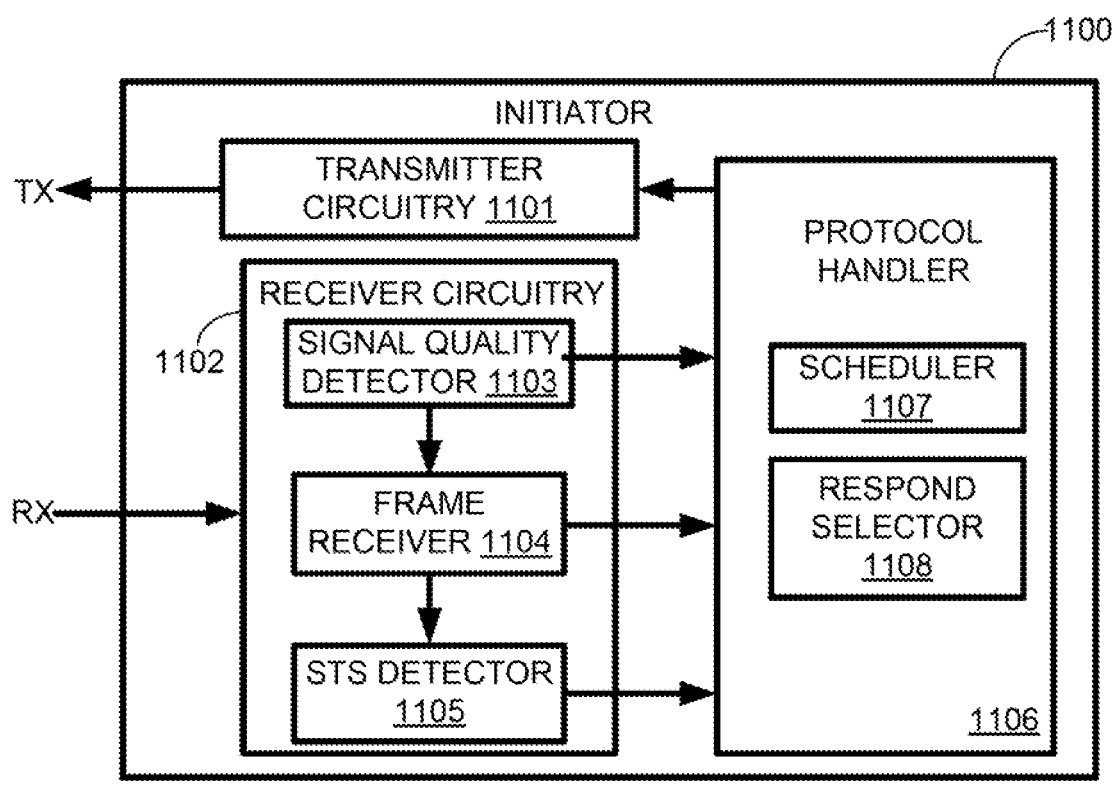
FIG. 11 illustrates circuitry within an initiator in accordance with embodiments of the present disclosure.
Figure 12:
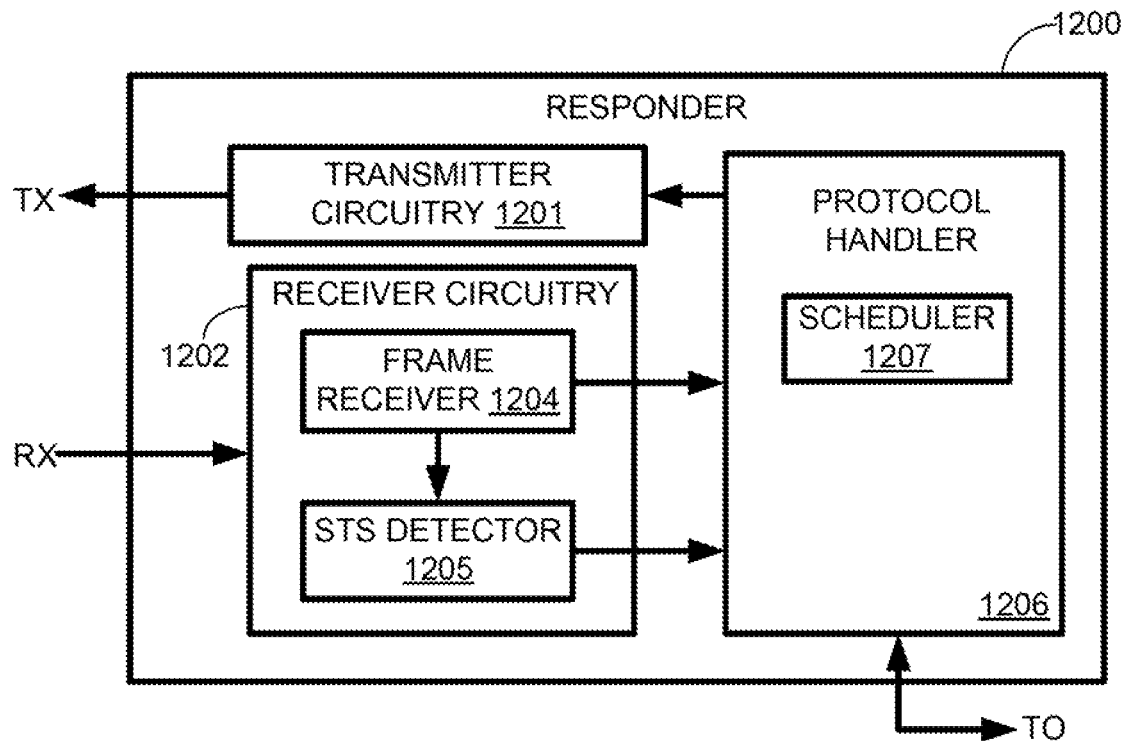
FIG. 12 illustrates circuitry within a responder in accordance with embodiments of the present disclosure.

Embodiments of the present disclosure are now described with reference to FIGS. 5-12. (Note that in FIGS. 6 and 7, the preamble is designated by the label "PREAM.") FIG. 11 illustrates a block diagram of aspects of an initiator 1100 utilized within embodiments of the present disclosure described herein with respect to FIGS. 5-10. For example, aspects of the transmitter circuitry 1101 and the receiver circuitry 1102 may be implemented within the transceiver circuitry 310 and/or the controller 306 of the initiator 120 described with respect to FIG. 3, while aspects of the protocol handler 1106 may be implemented within the controller 306. FIG. 12 illustrates a block diagram of aspects of a responder 1200 utilized within embodiments of the present disclosure described herein with respect to FIGS. 5-10. For example, aspects of the transmitter circuitry 1201 and the receiver circuitry 1202 may be implemented within transceiver circuitry of each of the responders 101-106, while aspects of the protocol handler 1206 may be implemented within the controller 212 described with respect to FIG. 2, or within a controller (not shown) implemented within each of the responders 101-106.

Referring to FIG. 5, in the optional process block 501, an initiator (e.g., the key fob 120) may receive one or more signals from one or more sensors (e.g., the sensors 224, 226, 228). As previously described, when the initiator is physically within a range of one or more of the sensors, receiver circuitry within the initiator may be able to receive and decode a beacon (e.g., transmitted by a LF coil associated with one or more of the sensors). In the optional process block 502, receipt of such a LF signal by the initiator "wakes up" the initiator.

Figure 6:
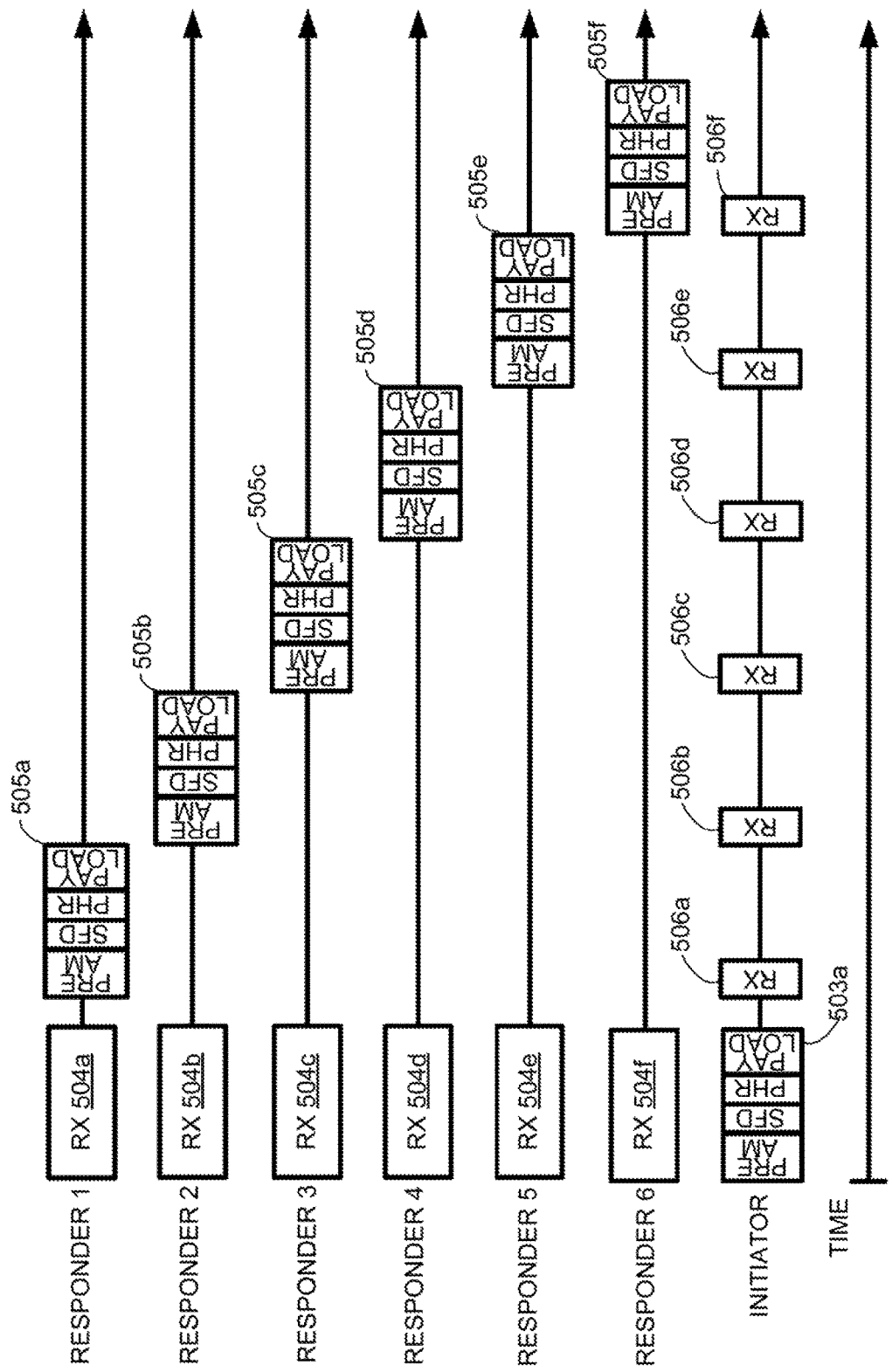
FIG. 6 illustrates a block diagram schematically demonstrating the process blocks 503-507 of the process 500.

Referring now to FIGS. 5 and 6, in the process block 503, the initiator transmits a packet 503a, such as illustrated in FIG. 4. In accordance with embodiments of the present disclosure, the packet is transmitted by the initiator utilizing transmitter circuitry (e.g., the transmitter circuitry 1101 of FIG. 11) configured to do so using a high bandwidth signal, such as UWB. The payload may contain an instruction for the responders 1-6 to send reply packets.

In accordance with embodiments of the present disclosure, the process block 503 may be commenced by the initiator in response to a "wake up" mechanism implemented in the process block 502, or the process block 503 may be commenced in the initiator by some other process, mechanism, or signal. Examples of such "wake up" mechanisms include, but are not limited to, a LF field detector, a RF polling mechanism, a wakeup timer, a polling timer, a motion sensor, and a button press. In accordance with embodiments of the present disclosure, a LF field detector implemented with the initiator (e.g., within the transceiver circuitry 310) may be configured to monitor for reception of a LF signal (e.g., received from a LF transmitter associated with a sensor of the responder) and perform a "wake up" of the initiator when the field strength of such a LF signal exceeds a predetermined threshold and/or a certain predetermined LF message is received. In accordance with embodiments of the present disclosure, a RF polling mechanism (e.g., implemented within the controller 306) may be configured to periodically activate a RF receiver (e.g., within the transceiver circuitry 310), search for an RF frame (e.g., transmitted by a sensor of the responder), and perform a "wake up" when a predetermined RF message is received. In accordance with embodiments of the present disclosure, a wakeup timer (e.g., implemented within the controller 306) may be configured to perform a "wake up" when a predetermined time period has passed and a new ranging operation exchange is expected (e.g., for location tracking, a ranging operation could be attempted at regular intervals). In accordance with embodiments of the present disclosure, a polling timer (e.g., implemented within the controller 306) may be configured to perform a "wake up" of the initiator when a predetermined time period has passed so that the initiator begins to search for a packet sent by a responder. In accordance with embodiments of the present disclosure, a motion sensor (not shown) implemented within the initiator may be configured to perform a "wake up" of the initiator when the initiator is moved (e.g., the user is walking). In accordance with embodiments of the present disclosure, a button press mechanism may be configured to "wake up" the initiator, for example, by the user manually pressing a button (e.g., a user input device 110).

In the process block 504, one or more of the responders 1-6 receive the transmitted packet utilizing receiver circuitry (e.g., the receiver circuitry 1202 of FIG. 12) configured to receive such a high bandwidth signal. Each of the responders that receive the packet then processes the packet utilizing the frame receiver 1204 of FIG. 12. The frame receiver 1204 may be configured to demodulate frames in the received packet, decode the payload, and provide the payload to the protocol handler 1206.

In the process block 505, each such responder then transmits a response packet in a time-multiplexed, or time-interleaved, manner, such as depicted in FIG. 6 by the transmission of the packets 505a-505f by the responders 1-6, respectively. Such packets may be configured as the packet illustrated in FIG. 4. In accordance with embodiments of the present disclosure, the responder(s) receiving the packet transmitted by the initiator may include, in their processing of the packet, a communication to the controller 212 of FIG. 2 that a packet has been received by the responder. The controller 212, or a protocol handler 1206 in a responder (see FIG. 12), may then control the transmission of the packets by the responders in such a time-multiplexed manner (see FIG. 10). For example, referring to FIG. 12, in each responder, a scheduler 1207 in the protocol handler 1206 may receive from the controller 212 a time by which the responder is to transmit its respective response packet so that the responders 1-6 transmit their respective packets at different times from each other. The protocol handler 1206 in each responder interprets the payload in the received packet. If the payload meets certain expected criterion, then the scheduler 1207 schedules the transmission of a suitable response frame. Non-limiting examples for expected criterion are a certain predetermined source address, a certain predetermined destination address, or a certain predetermined authentication pattern. The criterion is met if the address or pattern matches with the expected value.

In accordance with embodiments of the present disclosure, if not all of the responders had received the packet transmitted by the initiator, the controller may signal all or a select number of the responders to transmit the response packets in the process block 505, including by one or more responders that had not received the packet 503a transmitted by the initiator.

In the process block 506, the initiator receives in the time-multiplexed manner (as depicted by the RX blocks 506a-506f in FIG. 6) each of the packets 505a-505f transmitted by the responders 1-6. In accordance with embodiments of the present disclosure, the receiver circuitry 1102 of the initiator detects and processes with its frame receiver 1104 only a portion of the preamble of each of the packets 505a-505f. The frame receiver 1104 may be configured to attempt to detect the preamble portion using a process commonly known as frame acquisition. For example, the frame receiver 1104 may be configured to implement a correlation with an expected preamble symbol, or a sequence of preamble symbols, in order to detect the preamble portion. Additionally, the frame receiver 1104 may be configured to tolerate a certain RF frequency and sampling frequency offset in order to perform such a detection process. When the frame receiver 1104 determines that a valid (i.e., expected) preamble portion has been detected, it employs the signal quality detector 1103 to derive one or more of the signal quality metrics previously disclosed herein.

Referring to FIG. 4, a portion of the preamble is a fragment, or subset, of the total bits within a preamble of the packet. By doing so, the power expended by the initiator is reduced. For example, in the case of an initiator being powered only by a small power supply 314 (e.g., a coin cell battery), the power capacity of such a small power supply 314 is conserved, thus extending the life of the power supply 314.

In accordance with embodiments of the present disclosure, processing of only a portion of the preamble of each of the packets 505a-505f may be implemented by the receiver circuitry 1102 of the initiator configured to only activate (e.g., supply power to) its receiver circuitry 1102 until such a portion of the preamble of each of the packets 505a-505f has been received, and then deactivating (e.g., terminate the supply of power to) the receiver circuitry 1102 until the next response packet is received. For example, in accordance with embodiments of the present disclosure, the scheduler 1107 may be configured to open and close receive windows during time periods when it expects the responders to transmit their respective preambles. Such a receive window may be opened by supplying power to the receiver circuitry 1102 and commencing the frame acquisition by the frame receiver 1104, as previously described. For example, a timer implemented within the scheduler 1107 may be started at the beginning of each receive window. The receive window is then closed after either a packet or frame has been received or the timer indicates that the expected receive window duration has passed. A receive window may be closed by deactivating the frame acquisition by the frame receiver 1104 by powering down the receiver circuitry 1102.

As each of the packets 505a-505f is processed by the initiator, a signal quality detector 1103 (see FIG. 11) within the initiator utilizes the preamble portion of the packets sent by the responders to measure one or more predetermined signal quality metrics associated with each received packet, associates such measured signal quality metrics with each of the responders that transmitted the packets, and may store such signal quality metrics (e.g., in the memory 308). In accordance with embodiments of the present disclosure, the initiator may be configured to "know in advance" (e.g., is pre-programmed) which responder is scheduled to respond, and at what time. These scheduled response times can either be signaled to the initiator from any one of the responders via a higher layer protocol exchange, or they may be fixed (e.g., pre-programmed) within the initiator for a certain application. Hence, the initiator implicitly knows which responder has sent each frame.

As previously disclosed herein, the signal quality metrics may be used by the initiator to perform a preselection of a particular responder (e.g., the most suitable responder), or a subset of the total number of responders. Then, a complete ranging operation is only performed with the selected responder(s). Though FIGS. 5 and 9 are described with respect to utilizing received signal strength as the signal quality metric, several different possible signal quality metrics may be used including, but not limited to, "strength of the received signal carrying the packet," "preamble acquisition successful," "power of the main path," and "received signal strength indicator (RSSI)." For example, when the frame receiver 1104 detects a valid (i.e., expected) preamble portion, the "preamble acquisition successful" metric is fulfilled. In a typical environment, there may be multiple reflectors present, which results in a commonly known multipath environment. The strongest component of the multipath is referred to as a main path. When a multipath response is detected by the initiator, the signal quality detector 1103 may be configured to estimate the power of the main path to determine the "power of the main path" metric. The signal quality detector 1103 may be configured to measure the overall power level of the received packets to determine the "received signal strength indicator (RSSI)" metric.

In accordance with embodiments of the present disclosure, the process block 506 may be performed until packets have been received from each responder (e.g., the responders 1-6). As previously disclosed, the initiator may be configured to "know" how many responders are used in the system and at what time intervals they will respond. When the last time interval has passed, the initiator can then determine that all responders have sent packets. In the process block 507, the initiator selects with the respond selector 1108 one of the responders in accordance with the particular measured metric utilized. For example, if the measured metric is signal strength, then the process block 507 may be performed by the respond selector 1108 comparing the stored signal strengths to each other.

In the process block 508, the initiator will initiate a ranging operation with the selected responder. Examples of such a ranging operation are described herein with respect to FIG. 7.

In accordance with alternative embodiments of the present disclosure, the initiator may be configured to select more than one of the responders 1-6 for ranging in the process block 508, for example, by selecting the responders associated with the largest N (where N>1) signal strengths. In accordance with further alternative embodiments of the present disclosure, the initiator may be configured to select one or more of the responders 1-6 by selecting the responder(s) associated with signal strengths within a predetermined range of signal strengths.

In accordance with further alternative embodiments of the present disclosure, the initiator may be configured (i.e., within the process blocks 506-508) to perform ranging with a responder associated with a signal strength that exceeds a predetermined threshold value. For example, referring to FIG. 6, the initiator may be configured to not process packet(s) from Responders 5 and 6 if the signal strength associated with the packet received from Responder 4 was determined (measured) to be greater than such a predetermined threshold value. This may be performed by the initiator deactivating its receiver circuitry 1102 after receiving and processing the packet from Responder 4.

Referring to FIGS. 6, 9, and 11, there is illustrated a process 900 performed within an initiator (e.g., the key fob 120) in accordance with embodiments of the present disclosure. The process blocks 501-503 were previously described with respect to FIG. 5. After transmitting its packet 503a, the initiator, in the process block 901 waits to receive a response packet from one of the responders 1-6. When such a response packet is received, the initiator will process with the frame receiver 1104 a portion of the preamble of the response packet in the process block 902 as similarly described with respect to the process block 506. In the process block 903, the signal quality detector 1103 in the initiator will measure the predetermined metric (e.g., determine the strength of the signal transmitting the response packet) and associate it with the particular transmitting responder. The initiator will then wait to receive any other packets by returning to the process block 901.

FIG. 6 schematically illustrates a non-limiting example of the functioning of the process blocks 901-903. As previously described, the responders 1-6 transmit their response packets 505a-505f in a time-multiplexed manner as described with respect to the process block 505. The initiator is configured to only receive and process a portion of the preamble of each of the received response packets, which is also schematically illustrated in FIG. 6.

When response packets from all of the responders have been received by the initiator, the process 900 may proceed to the process block 507 in which the initiator determines the responder associated with the strongest signal as previously described with respect to FIG. 5 (or alternatively, the initiator selects more than one responder with the strongest signals, selects one or more responders associated with signals that exceed a predetermined threshold value, or selects one or more responders associated with signal(s) that are within a predetermined signal strength range).

Figure 7:
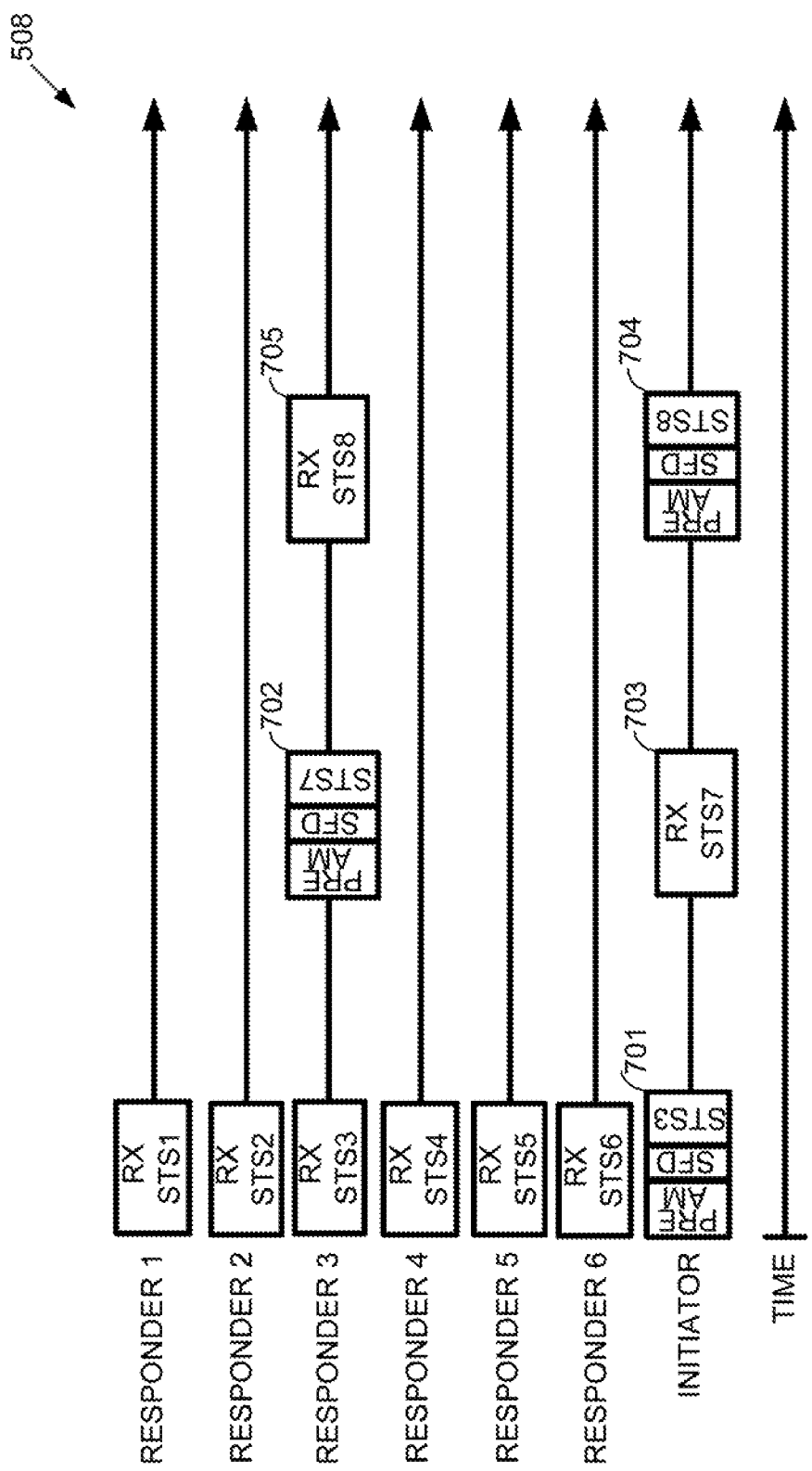
FIG. 7 illustrates a block diagram schematically demonstrating an example of the process block 508 of the process 500.

As previously described with respect to FIG. 5, the initiator then performs ranging with the selected responder(s) in the process block 508, which is further described with respect to FIG. 7. Thereafter, the initiator may be optionally configured to enter into a sleep mode in the process block 904. Note that a similar sleep mode may be optionally entered into by the initiator if it does not receive a response packet from any responders subsequent to the process block 503.

Referring next to FIG. 10, there is illustrated a flow diagram of processes that may be performed by the responders 1-6 communicating with the initiator as previously described with respect to FIGS. 5-7. The process block 504 was previously described with respect to FIG. 5, and is schematically depicted in FIG. 6 by the responders 1-6 receiving (denoted by "RX" in each of the blocks labeled as 504a . . . 5040 the packet 503a transmitted by the initiator.

In the process block 1002, a first responder (e.g., Responder 1) transmits its packet 505a in response to receipt (by any one of the responders 1-6) of the packet 503a. In the process block 1003, a determination is made whether all of the responders 1-6 have transmitted their respective packets in response to receipt of the packet 503a. Recall that in accordance with embodiments of the present disclosure, the responders 1-6 transmit their respective packets 505a-505f in a time-multiplexed manner, such as depicted in FIG. 6.

Referring to FIGS. 2, 6, and 12, such a time-multiplexed process for transmitting the packets 505a . . . 505f by the responders 1-6 may be performed by the controller 212. In accordance with the non-limiting example illustrated in FIG. 6, in the process block 1003, after Responder 1 has transmitted its packet 505a, it will be determined (e.g., by the controller 212) that Responder 2 is scheduled next to transmit its packet 505b in the process block 1002. This loop between the process blocks 1002 and 1003 may continue until all of the responders 1-6 have transmitted their packets.

Note that, in accordance with embodiments of the present disclosure, instead of performing the process blocks 1002-1003, the controller 212 may simply instruct each of the responders 1-6 to transmit their respective packets at a certain scheduled time that effectively results in the packets 505a . . . 505f being transmitted in the aforementioned time-multiplexed manner. This may be accomplished by the controller 212 transmitting each of the transmit times to the scheduler 1207 in each of the responders 101-106.

After all of the responders 1-6 have transmitted their respective packets (e.g., the packets 505*a* . . . 505*o*, the responders 1-6 wait for receipt of a follow-on packet to be received from the initiator. In accordance with embodiments of the present disclosure, a "time out" may be performed in the process block 1004 in case that no such follow-on packet is received from the initiator within a specified period of time.

If a follow-on packet is received by one or more of the responders 1-6 from the initiator, it may be configured as a ranging packet (e.g., in accordance with IEEE 802.15.4a), and therefore, a ranging operation in accordance with the process block 508 will be performed (and also possibly the optional process block 509 thereafter). In accordance with embodiments of the present disclosure, such a ranging operation may be performed using a single-sided ranging protocol or a double-sided ranging protocol, as hereinafter described.

As previously noted, such a ranging operation may utilize ToF calculations to determine a distance with high precision between the initiator and the selected responder. Referring to FIG. 7, the following describes the calculation of the ToF between the initiator and the selected responder, using Time-of-Arrival ("ToA") and Time-of-Departure ("ToD") measurements for RF packets transmitted there between in a single-sided ranging protocol. For purposes of this example, Responder 3 will be used as the responder selected by the Initiator in the process block 507, and as described with respect to FIG. 6. The operation starts with the Initiator transmitting a "Request" packet 701 to Responder 3 with a measured ToD ("$t_{toda}$"). Upon receipt of the Request packet, Responder 3 measures the ToA ("$t_{toaB}$") and transmits a "Response" packet 702 back to the Initiator with a measured (or predetermined) ToD ("$t_{todB}$"). Upon receipt of the Response packet 702, the Initiator measures the ToA of the Response packet 702 ("$t_{toaA}$"). From the measured (or otherwise derived) ToDs and ToAs, a roundtrip duration ($T_{rtt}=t_{todA}-t_{toaA}$) and a response duration ($T_{rsp}=t_{toaB}-t_{todB}$) can be calculated. The ToF between the Initiator and Responder 3 may then be estimated from the roundtrip duration and response duration: $ToF=0.5*(T_{rtt}-T_{rsp})$.

Figure 8:
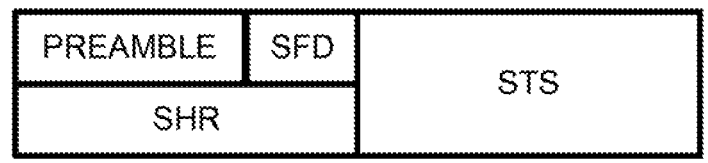
FIG. 8 illustrates an example of a secure ranging frame format.

Note that this ranging operation may be performed with the initiator receiving and processing the entire response packet 702. In accordance with certain embodiments of the present disclosure, such a ranging operation may incorporate a security protocol, such as a secure ranging frame format that inserts a Scrambled Timestamp Sequence ("STS") frame within the ranging packets, such as illustrated in FIG. 8. Such STS frames may be formatted in a basic HRP PPDU format. As illustrated in the exemplary ranging operation of FIG. 7, each of the responders may be assigned with a unique STS. For example, Responder 3 may be assigned STS3. Since the Initiator has selected Responder 3, the packet 701 will be transmitted to include the STS3, which will be recognized by Responder 3 (e.g., see the STS Detector 1205 of FIG. 12). Since the other responders (i.e., Responders 1-2 and 4-6) did not receive a packet containing their respective STS, none of these responders will then transmit a Response packet. However, since Responder 3 did receive a packet containing its assigned STS3, Responder 3 will transmit its Response packet 702.

In accordance with certain embodiments of the present disclosure, the PKE system may be configured to implement a double-sided two-way ranging protocol. To verify that the previously described range calculation was accurate, the same procedure is repeated by Responder 3 sending its Response packet 702, which may contain an STS (e.g., STS7) assigned to the Initiator. The Initiator receives and processes 703 this packet, including recognizing the STS7 (e.g., see the STS Detector 1105 of FIG. 11), and transmits the packet 704 back to Responder 3, which may contain a different STS (e.g., STS8), which is received and processed 705 by Responder 3. At the end of this procedure, the two range values are determined and an average of the two can be used to achieve a fairly accurate distance measurement between the Initiator and Responder 3. There a several well-known formulas that can be used to improve the ranging estimate (e.g., accounting for a crystal offset between initiator and responder). Embodiments of the present disclosure are not limited to a specific ranging sequence or ranging formula.

In accordance with embodiments of the present disclosure, the STS may be generated within the initiator and responders by a random bit generator.

As previously described with respect to FIGS. 6 and 7, embodiments of the present disclosure are configured so that the initiator preselects one or more of the responders before performing a complete ranging operation (as described with respect to FIG. 7) with the selected responder(s). Such a preselection is performed by the initiator only receiving and processing a portion (fragment) of the preamble of each of the packets transmitted by the responders, even though the responders have each transmitted an entire IEEE compliant packet (e.g., a packet formatted in accordance with IEEE 802.15.4a, such as illustrated in FIG. 4). In accordance with embodiments of the present disclosure, the initiator conserves power by activating its receiver circuitry only to receive and process each preamble portion, thus deactivating its receiver circuitry otherwise.

In accordance with alternative embodiments of the present disclosure, the responder may be configured to only transmit such portions of the preambles instead of the entire packet.

Such a system and process not only conserves power in the initiator but also decreases the total amount of time required for the initiator to complete a ranging operation with a selected responder, or responders. Without implementation of embodiments of the present disclosure, the initiator would be required to perform a complete ranging operation (such as illustrated in FIG. 7) with each of the responders (e.g., the responders 1-6 in FIG. 6), which would expend more power by the initiator and require additional time to complete.

Though embodiments of the present disclosure have been described with respect to communications between an initiator and a plurality of responders, aspects of the present disclosure are also applicable for communications between an initiator and a single responder, between multiple initiators and a single responder, and between multiple initiators and multiple responders.

Aspects of the present disclosure provide a method for performing ranging between an initiator and a plurality of responders in a wireless communication system, the method including the initiator selecting one of the plurality of responders as a function of a measured signal quality metric associated with only a portion of the preamble of the packets received from each of the plurality of responders, and performing a ranging operation between the initiator and the selected responder. The initiator selecting one of the plurality of responders as a function of the measured signal quality metric further includes the initiator transmitting a first packet, a first one of the plurality of responders receiving the first packet, the first one of the plurality of responders transmitting a second packet in response to receipt of the first packet, and the initiator receiving and processing only a portion of a preamble of the second packet in order to measure a signal quality metric associated with a signal carrying the second packet. The measured signal quality metric may be a strength of the signal carrying the second packet. The initiator selecting one of the plurality of responders as a function of the measured metric may further include the initiator selecting the first one of the plurality of responders for performing the ranging operation when the strength of the signal carrying the second packet is within a predetermined range of signal strengths. The initiator selecting one of the plurality of responders as a function of the measured metric may further include the initiator selecting the first one of the plurality of responders for performing the ranging operation when the strength of the signal carrying the second packet exceeds a predetermined threshold signal strength. The initiator selecting one of the plurality of responders as a function of the measured metric may further include a second one of the plurality of responders transmitting a third packet in response to receipt of the first packet, the initiator receiving and processing only a portion of a preamble of the third packet in order to measure a strength of a signal carrying the third packet, the initiator comparing the strength of the signal carrying the second packet to the strength of the signal carrying the third packet, and the initiator performing the ranging operation with the responder associated with a strongest of the first and second signal strengths. The wireless communication system may be implemented with ultra-wideband technology, wherein the second packet is an IEEE compliant packet. The initiator receiving and processing only a portion of the preamble of the second packet may further include the initiator activating its receiver circuitry only to receive the portion of the preamble of the second packet. The wireless communication system may be a passive keyless entry system, wherein the initiator is implemented in a key fob and the plurality of responders are anchors positioned in a vehicle.

Aspects of the present disclosure provide a method for performing ranging between an initiator and a plurality of responders in a wireless communication system, the method including transmitting a first packet by a first responder, receiving by receiver circuitry in the initiator only a portion of a preamble of the first packet, measuring by a signal quality detector in the initiator a first metric associated with a first signal carrying the portion of the preamble of the first packet, transmitting a second packet by a second responder, receiving by the receiver circuitry in the initiator only a portion of a preamble of the second packet, measuring by the signal quality detector in the initiator a second metric associated with a second signal carrying the portion of the preamble of the second packet, comparing the first and second metrics by a respond selector in the initiator, and performing a ranging operation between the initiator and the first responder as a function of the comparison of the first and second metrics. The method may further include transmitting a third packet by the initiator, wherein the transmitting of the first packet by the first responder and the transmitting of the second packet by the second responder are performed in response to receipt of the third packet, and wherein the transmitting of the first packet by the first responder and the transmitting of the second packet by the second responder are performed in a time-multiplexed manner. In accordance with certain aspects of the present disclosure, a ranging operation between the initiator and the second responder is not performed as a function of the comparison of the first and second metrics. The first metric may be a measured strength of the first signal, and the second metric may be a measured strength of the second signal. The performing of the ranging operation between the initiator and the first responder as a function of the comparison of the first and second metrics may further include the initiator selecting the first responder for performing the ranging operation when the measured strength of the first signal carrying the first packet exceeds the measured strength of the second signal carrying the second packet. The first and second signals may be transmitted utilizing ultra-wideband frequencies. The receiving by the receiver circuitry in the initiator only a portion of a preamble of the first packet may further include the initiator activating the receiver circuitry so that it only processes the portion of the preamble of the first packet.

Aspects of the present disclosure provide a wireless tag configured to communicate in a UWB communication system, the wireless tag including transmitter circuitry configured to transmit a first packet, receiver circuitry configured to receive and process only a subset of a preamble of a second packet received over the UWB communication system transmitted from a first anchor in response to receipt of the first packet, a signal quality detector configured to measure a first metric associated with receipt of the second packet and associate the first metric with the first anchor, the receiver circuitry configured to receive and process only a subset of a preamble of a third packet received over the UWB communication system transmitted from a second anchor in response to receipt of the first packet, the signal quality detector configured to measure a second metric associated with receipt of the third packet and associate the second metric with the second anchor, a respond selector configured to select either the first or the second anchor as a function of a comparison of the first and second metrics, and the wireless tag configured to perform a ranging operation with the selected anchor. The first metric may be a strength of a first signal carrying the second packet, and the second metric may be a strength of a second signal carrying the third packet. The second and third packets may be IEEE compliant packets. The second and third packets may be received by the wireless tag in a time-multiplexed manner.

While these exemplary embodiments are described in sufficient detail to enable those skilled in the art to practice the invention, it should be understood that other embodiments may be realized and that various changes to the invention may be made without departing from the spirit and scope of the present invention.

The singular forms "a," "an," and "the" include plural referents unless the context clearly dictates otherwise.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

Any steps recited in any method or process claims may be executed in any order and are not limited to the order presented in the claims. Means-plus-function or step-plus function limitations will only be employed where for a specific claim limitation all of the following conditions are present in that limitation: a) "means for" or "step for" is expressly recited; and b) a corresponding function is expressly recited. The structure, material, or acts that support the means-plus function are expressly recited in the description herein. Accordingly, the scope of the invention should be determined solely by the appended claims and their legal equivalents, rather than by the descriptions and examples given herein.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of mass, weight, time, volume, concentration or percent is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

What is claimed is:

1. A method for performing ranging between an initiator and a plurality of responders in a wireless communication system, the method comprising:
   the initiator selecting one of the plurality of responders as a function of a measured signal quality metric associated with only a portion of the preamble of the packets received from each of the plurality of responders; and
   performing a ranging operation between the initiator and the selected responder.

2. The method as recited in claim 1, wherein the initiator selecting one of the plurality of responders as a function of the measured signal quality metric further comprises:
   the initiator transmitting a first packet;
   a first one of the plurality of responders receiving the first packet;
   the first one of the plurality of responders transmitting a second packet in response to receipt of the first packet; and
   the initiator receiving and processing only a portion of a preamble of the second packet in order to measure a signal quality metric associated with a signal carrying the second packet.

3. The method as recited in claim 2, wherein the measured signal quality metric is a strength of the signal carrying the second packet.

4. The method as recited in claim 3, wherein the initiator selecting one of the plurality of responders as a function of the measured metric further comprises the initiator selecting the first one of the plurality of responders for performing the ranging operation when the strength of the signal carrying the second packet is within a predetermined range of signal strengths.

5. The method as recited in claim 3, wherein the initiator selecting one of the plurality of responders as a function of the measured metric further comprises the initiator selecting the first one of the plurality of responders for performing the ranging operation when the strength of the signal carrying the second packet exceeds a predetermined threshold signal strength.

6. The method as recited in claim 3, wherein the initiator selecting one of the plurality of responders as a function of the measured metric further comprises:
   a second one of the plurality of responders transmitting a third packet in response to receipt of the first packet;
   the initiator receiving and processing only a portion of a preamble of the third packet in order to measure a strength of a signal carrying the third packet;
   the initiator comparing the strength of the signal carrying the second packet to the strength of the signal carrying the third packet; and
   the initiator performing the ranging operation with the responder associated with a strongest of the first and second signal strengths.

7. The method as recited in claim 2, wherein the wireless communication system is implemented with ultra-wideband technology, wherein the second packet is an IEEE compliant packet.

8. The method as recited in claim 7, wherein the initiator receiving and processing only a portion of the preamble of the second packet further comprises the initiator activating its receiver circuitry only to receive the portion of the preamble of the second packet.

9. The method as recited in claim 1, wherein the wireless communication system is a passive keyless entry system, wherein the initiator is implemented in a key fob and the plurality of responders are anchors positioned in a vehicle.

10. A method for performing ranging between an initiator and a plurality of responders in a wireless communication system, the method comprising:
    transmitting a first packet by a first responder;
    receiving by receiver circuitry in the initiator only a portion of a preamble of the first packet;
    measuring by a signal quality detector in the initiator a first metric associated with a first signal carrying the portion of the preamble of the first packet;
    transmitting a second packet by a second responder;
    receiving by the receiver circuitry in the initiator only a portion of a preamble of the second packet;
    measuring by the signal quality detector in the initiator a second metric associated with a second signal carrying the portion of the preamble of the second packet;
    comparing the first and second metrics by a respond selector in the initiator; and
    performing a ranging operation between the initiator and the first responder as a function of the comparison of the first and second metrics.

11. The method as recited in claim 10, further comprising transmitting a third packet by the initiator, wherein the transmitting of the first packet by the first responder and the transmitting of the second packet by the second responder are performed in response to receipt of the third packet, and wherein the transmitting of the first packet by the first responder and the transmitting of the second packet by the second responder are performed in a time-multiplexed manner.

12. The method as recited in claim 10, wherein a ranging operation between the initiator and the second responder is not performed as a function of the comparison of the first and second metrics.

13. The method as recited in claim 10, wherein the first metric is a measured strength of the first signal, and wherein the second metric is a measured strength of the second signal.

14. The method as recited in claim 13, wherein the performing of the ranging operation between the initiator and the first responder as a function of the comparison of the first and second metrics further comprises the initiator selecting the first responder for performing the ranging operation when the measured strength of the first signal carrying the first packet exceeds the measured strength of the second signal carrying the second packet.

15. The method as recited in claim 10, wherein the first and second signals are transmitted utilizing ultra-wideband frequencies.

16. The method as recited in claim 10, wherein the receiving by the receiver circuitry in the initiator only a portion of a preamble of the first packet further comprises the initiator activating the receiver circuitry so that it only processes the portion of the preamble of the first packet.

17. A wireless tag configured to communicate in a UWB communication system, the wireless tag comprising:

transmitter circuitry configured to transmit a first packet;

receiver circuitry configured to receive and process only a subset of a preamble of a second packet received over the UWB communication system transmitted from a first anchor in response to receipt of the first packet;

a signal quality detector configured to measure a first metric associated with receipt of the second packet and associate the first metric with the first anchor;

the receiver circuitry configured to receive and process only a subset of a preamble of a third packet received over the UWB communication system transmitted from a second anchor in response to receipt of the first packet;

the signal quality detector configured to measure a second metric associated with receipt of the third packet and associate the second metric with the second anchor;

a respond selector configured to select either the first or the second anchor as a function of a comparison of the first and second metrics; and the wireless tag configured to perform a ranging operation with the selected anchor.

18. The wireless tag as recited in claim 17, wherein the first metric is a strength of a first signal carrying the second packet, and wherein the second metric is a strength of a second signal carrying the third packet.

19. The wireless tag as recited in claim 17, wherein the second and third packets are IEEE compliant packets.

20. The wireless tag as recited in claim 17, wherein the second and third packets are received by the wireless tag in a time-multiplexed manner.

* * * * *